(12) United States Patent
Marechal

(10) Patent No.: US 8,517,310 B2
(45) Date of Patent: Aug. 27, 2013

(54) SYSTEM FOR FASTENING A SEAT IN AN AIRCRAFT RAIL

(75) Inventor: Xavier Marechal, Paris (FR)

(73) Assignee: Attax, Carrieres sur Seine, French Republic ( * ) Notice: Subject to any disclaimer, the term of this patent is extended or adjusted under 35 U.S.C. 154(b) by 345 days.

(21) Appl. No.: 13/047,050

(22) Filed: Mar. 14, 2011

(65) Prior Publication Data

US 2011/0278398 A1 Nov. 17, 2011

(30) Foreign Application Priority Data

Mar. 12, 2010 (FR) ...................................... 10 51796

(51) Int. Cl.
*B64D 25/00* (2006.01)
(52) U.S. Cl.
USPC .................. 244/122 R; 244/118.6; 248/503.1
(58) Field of Classification Search
USPC .......... 410/104, 105; 248/503.1; 244/122 R, 244/118.6, 118.5
See application file for complete search history.

(56) References Cited

U.S. PATENT DOCUMENTS

| 4,213,593 A | | 7/1980 | Weik | |
|---|---|---|---|---|
| 4,230,432 A | * | 10/1980 | Howell | 410/102 |
| 4,449,875 A | * | 5/1984 | Brunelle | 410/80 |
| 4,771,969 A | * | 9/1988 | Dowd | 244/118.6 |
| 5,236,153 A | | 8/1993 | LaConte | |
| 5,489,172 A | | 2/1996 | Michler | |
| 8,360,386 B2 | * | 1/2013 | Marechal | 248/503.1 |
| 8,408,853 B2 | * | 4/2013 | Womack et al. | 410/105 |
| 2010/0001126 A1 | * | 1/2010 | Supan et al. | 244/1 A |
| 2010/0116933 A1 | * | 5/2010 | Erickson et al. | 244/118.5 |
| 2011/0253874 A1 | * | 10/2011 | Marechal | 248/503.1 |

* cited by examiner

*Primary Examiner* — Christopher P Ellis
(74) *Attorney, Agent, or Firm* — Kenyon & Kenyon LLP

(57) ABSTRACT

A system for fastening an aircraft seat in a corresponding rail of the rest of the aircraft, of the type including a base to which the rest of the seat is connected and including support surfaces on the upper face of the rail and associated with a locking slide that can be moved by a lever under the control of an assembly operator, between an assembly/disassembly position of the system relative to the rail and a locking position thereof and therefore of the seat relative to the rail and therefore the aircraft, in which the support surfaces of the base on the rail include elastically deformable facing device(s) for reacting fastening play.

6 Claims, 2 Drawing Sheets

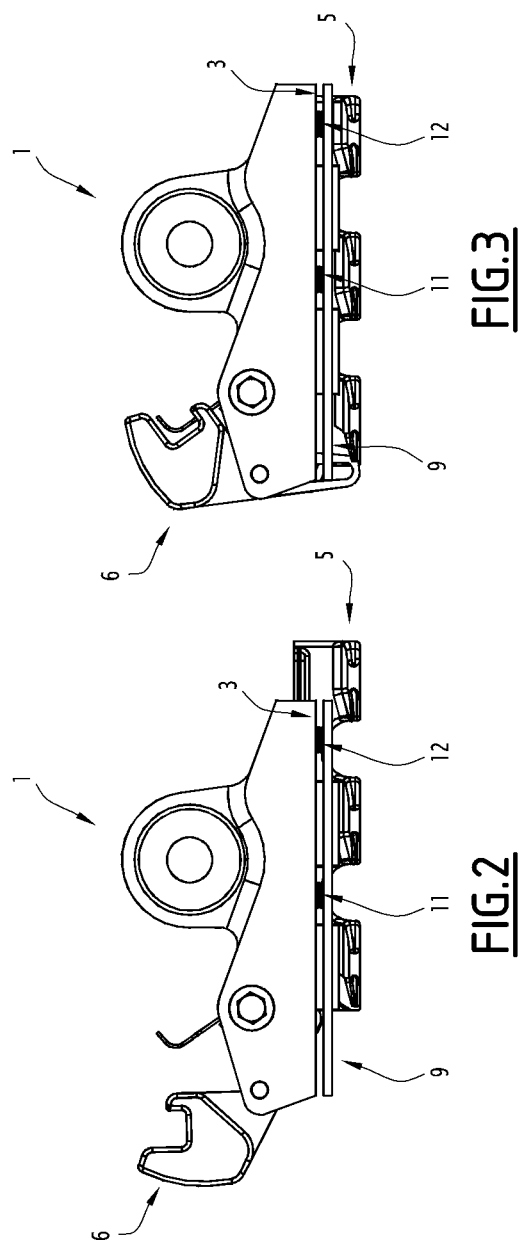

SYSTEM FOR FASTENING A SEAT IN AN AIRCRAFT RAIL

CROSS-REFERENCE TO RELATED APPLICATIONS

The present application claims priority to Application No. 10 51796, filed in the French Republic on Mar. 12, 2010, which is expressly incorporated herein in its entirety by reference thereto.

SUMMARY

The present invention relates to a system for fastening an aircraft seat in a corresponding rail of the rest of the aircraft.

More particularly, the invention relates to fastening systems of this type that include a base to which the rest of the seat is connected and which includes support surfaces on the upper face of the rail, the base being associated with a locking slide that can be moved by a lever under the control of an assembly operator, between an assembly/disassembly position of the system relative to the rail and a locking position thereof and therefore of the seat relative to the rail and therefore the aircraft.

These movement kinematics of these various pieces requires the presence of assembly play between these different parts and in particular between the base and the slide, to allow the relative movements of the parts.

However, this translates to locking imprecisions, or even risks of unhooking of the base and therefore the seat, from the rail.

Example embodiments of the present invention provide a system for fastening an aircraft seat in a corresponding rail of the rest of the aircraft, of the type including a base to which the rest of the seat is connected and including support surfaces on the upper face of the rail and associated with a locking slide that can be moved by a lever under the control of an assembly operator, between an assembly/disassembly position of the system relative to the rail and a locking position thereof and therefore of the seat relative to the rail and therefore the aircraft, in which the support surfaces of the base on the rail include elastically deformable facing device for reacting fastening play.

The fastening system may include one or more of the following features: the facing device may include plates made from an elastically deformable material; the plates of elastically deformable material may be made from polyurethane; the facing device may include support plates fastened on the support surfaces of the base using elastic devices; the elastic devices may include springs; and the springs may be helical springs.

Further features and aspects of example embodiments of the present invention are described in mode detail below with reference to the appended Figures.

BRIEF DESCRIPTION OF THE DRAWINGS

FIGS. 2 and 3 are side views of this system in the assembly/disassembly position and in the locking position, respectively.

DETAILED DESCRIPTION

Figure 1:
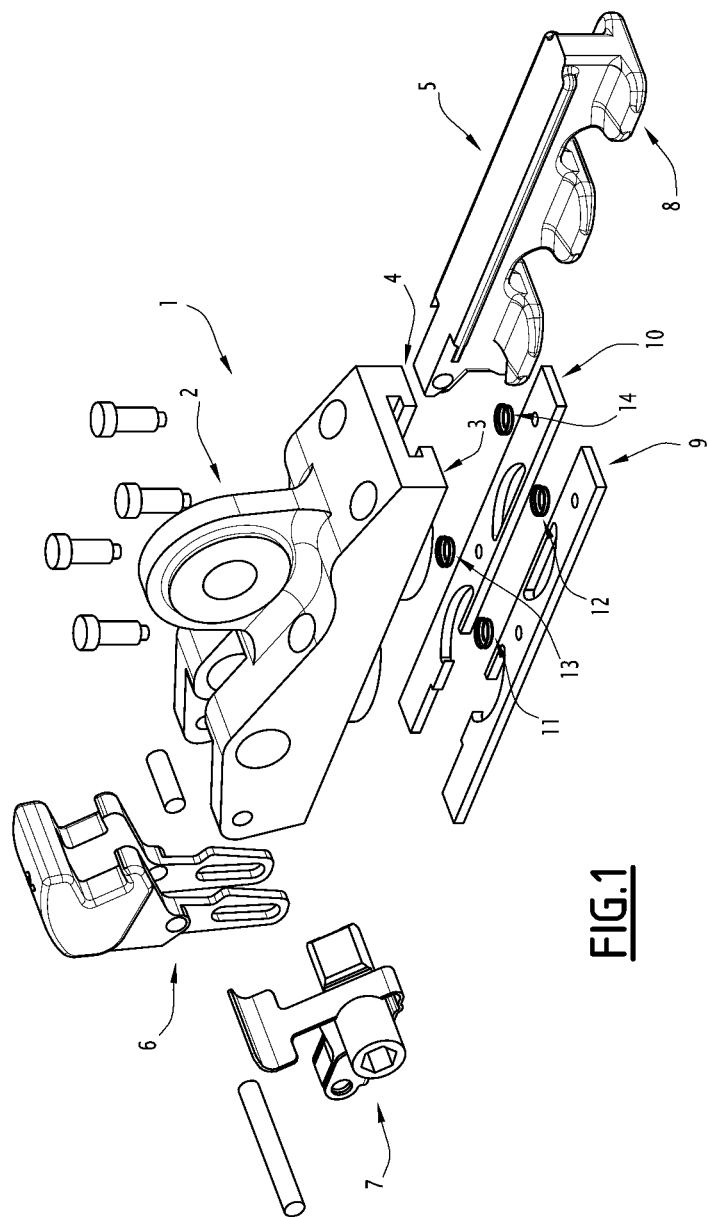
FIG. 1 is an exploded perspective view of a fastening system according to an example embodiment of the present invention.

As previously indicated, example embodiments of the present invention provide a system for fastening an aircraft seat in a corresponding rail of the rest of the aircraft.

Indeed, and as illustrated in the figures, this system traditionally includes a base, designated by general reference 1, to which the rest of the seat is connected.

Thus for example this base 1 includes a ring designated by general reference 2 for anchoring the rest of the seat.

At its lower portion, this base includes support surfaces on the upper face of the rail, these support surfaces being designated by general references 3 and 4, respectively, in the Figures.

This portion of the base is also associated with a locking slide designated by general reference 5, which can be moved using a lever designated by general reference 6, under the control of an assembly operator, between an assembled/disassembled position of the system relative to the rail and a locking position thereof and therefore of the seat relative to the rail and therefore the aircraft.

Indeed, the lever have any suitable traditional structure whatsoever, the lever 6 for example being hinged on the rest of the base and being associated with a device for locking in position designated by general reference 7, which can be actuated towards a disengaged position via a quarter-turn mechanism, for example.

As also illustrated in FIG. 1, the lower portion of the base and the upper portion of the slide include complementary guides in longitudinal motion while the lower portion of this slide also includes lateral protruding portions, one of which is for example designated by general reference 8, adapted to engage under complementary zones of the rail in order to grip the base against the rail in the locked position.

Moreover and in order to resolve the problems previously mentioned, the support surfaces of the base on the rail, i.e. the surfaces designated by general references 3 and 4 in FIG. 1, include elastically deformable facing device for reacting fastening play.

In the example embodiment illustrated in FIG. 1, the facing device is formed by support plates 9 and 10, respectively, fastened on the support surfaces 3 and 4 of the base, via elastic device for example made up of springs such as helical springs, designated by general references 11, 12, 13 and 14, respectively.

It is then possible to see that such a structure, and in particular the use of the elastically deformable facing device, make it possible to react all of the fastening play between the base, the rail, the slide and the lever.

This then makes it possible to improve the fastening of the seat on the rail.

This is for example illustrated in FIGS. 2 and 3, which generally show the base designated by general reference 1, the slide designated by general reference 5, the lever designated by general reference 6, and one of the facing plates 9 associated with its elastic fastening device 11 and 12 on the support surface 3.

In addition, for example, the elastically deformable facing device for reacting fastening play fastened on the support surfaces 3 and 4 of the base can also be formed directly by plates of an elastically deformable material such as polyurethane, for example.

What is claimed is:

1. A system for fastening an aircraft seat in a corresponding rail of the rest of the aircraft, the system including:
   a base to which the rest of the seat is connected and including support surfaces on an upper face of the rail;
   a lever; and
   a locking slide movable by the lever means under control of an assembly operator between an assembly/disassembly position of the system relative to the rail and a locking position thereof and therefore of the seat relative to the rail and therefore the aircraft;

wherein the support surfaces of the base on the rail include elastically deformable facing devices adapted to restrict fastening play.

2. The system according to claim 1, wherein the facing device include plates made from an elastically deformable material.

3. The system according to claim 2, wherein the plates of elastically deformable material are made from polyurethane.

4. The system according to claim 1, wherein the facing devices include support plates fastened on the support surfaces of the base by elastic devices.

5. The system according to claim 1, wherein the elastic devices include springs.

6. The system according to claim 5, wherein the springs include helical springs.

* * * * *